(12) United States Patent
Millerd et al.

(10) Patent No.: US 7,057,737 B2
(45) Date of Patent: Jun. 6, 2006

(54) COMMON OPTICAL-PATH TESTING OF HIGH-NUMERICAL-APERTURE WAVEFRONTS

(75) Inventors: James E. Millerd, Tucson, AZ (US); Neal J. Brock, Tucson, AZ (US); John B. Hayes, Tucson, AZ (US); James C. Wyant, Tucson, AZ (US)

(73) Assignee: 4D Technology Corporation, Tucson, AZ (US)

( * ) Notice: Subject to any disclaimer, the term of this patent is extended or adjusted under 35 U.S.C. 154(b) by 403 days.

(21) Appl. No.: 10/652,903

(22) Filed: Aug. 29, 2003

(65) Prior Publication Data

US 2005/0046863 A1 Mar. 3, 2005

(51) Int. Cl.
*G01B 9/02* (2006.01)

(52) U.S. Cl. .................................... 356/495; 356/515

(58) Field of Classification Search ............... 356/489, 356/495, 512, 513, 514, 515, 521
See application file for complete search history.

(56) References Cited

U.S. PATENT DOCUMENTS

| | | | |
|---|---|---|---|
| 4,575,247 A | 3/1986 | Tansey | |
| 4,624,569 A | 11/1986 | Kwon | |
| 4,744,658 A | 5/1988 | Holly | |
| 4,762,417 A | 8/1988 | Wu et al. | |
| 5,361,312 A | 11/1994 | Kuchel | |
| 5,589,938 A | 12/1996 | Deck | |
| 5,663,793 A | 9/1997 | de Groot | |
| 5,689,314 A | 11/1997 | Mercer | |
| 5,777,741 A | 7/1998 | Deck | |
| 5,835,217 A | 11/1998 | Medecki | |
| 5,883,717 A | 3/1999 | DiMarzio et al. | |
| 6,108,131 A | 8/2000 | Hansen et al. | |
| 6,122,103 A | 9/2000 | Perkins et al. | |
| 6,174,394 B1 | 1/2001 | Gvon et al. | |
| 6,208,463 B1 | 3/2001 | Hansen et al. | |
| 6,243,199 B1 | 6/2001 | Hansen et al. | |
| 6,304,330 B1 | 10/2001 | Millerd et al. | |
| 6,559,953 B1 * | 5/2003 | Davids | ........................ 356/521 |

OTHER PUBLICATIONS

Kadono et al, New common-path phase shifting interferometer using a polarization technique, Applied Optics, Mar. 1987.*

Guardalben et al, Experimental comparison of a liquid-christal point-diffraction interferometer (LCPDI) and a commercial phase-shifting interferometer and methods to improve LCPDI accuracy, Applied Optics, Mar. 2002.*

R.N. Smart and W.H. Steel, "Theory and Application of Point Diffraction Interferometers," Jpn. J. Appl. Phys., 14 351-356, 1975.

Hettwer et al., "Three channel phase-shifting interferometer using polarization-optics and a diffraction grating," Opt. Eng. 39(4), 960, 2000.

A. Jenson et al., "Finite-Aperture Wire Grid Polarizers," J. Opt. Soc. Am., Dec. 2000, 2191-2198.

D. Malacara et al., "Interferogram Analysis for Optical Testing," Chap. 8, Whiley Interscience, New York, 1998 (copy not available).

* cited by examiner

Primary Examiner—Samuel A. Turner
(74) Attorney, Agent, or Firm—Antonio R. Durando

(57) ABSTRACT

A polarizing point-diffraction plate is used to produce common-path test and reference wavefronts with mutually orthogonal polarizations from an input wavefront. The common-path test and reference wavefronts are collimated, phase shifted and interfered, and the resulting interferograms are imaged on a detector. The interference patterns are then processed using conventional algorithms to characterize the input light wavefront.

47 Claims, 11 Drawing Sheets

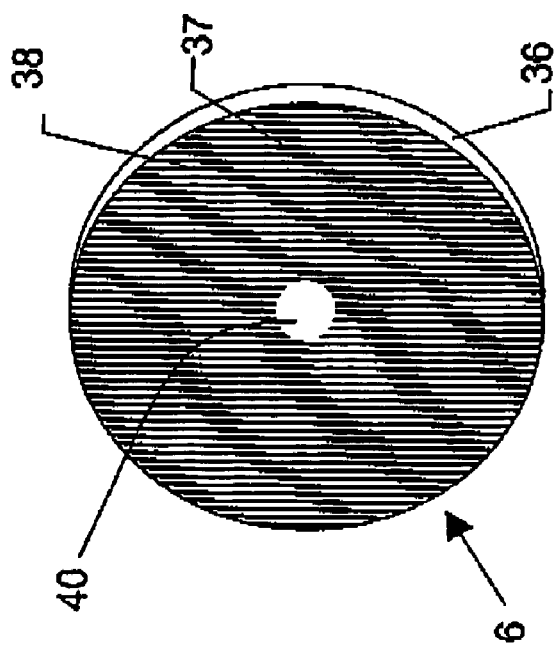
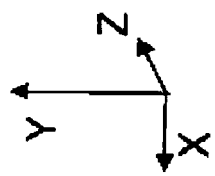
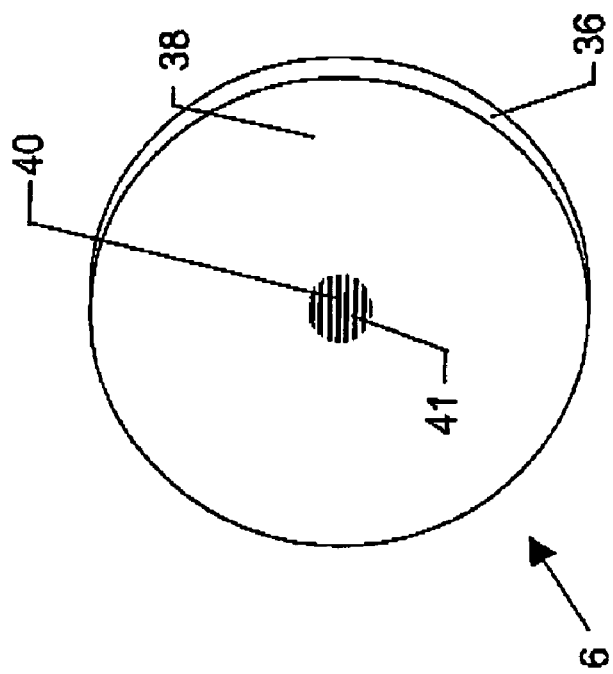
Figure 2D
Figure 2C

COMMON OPTICAL-PATH TESTING OF HIGH-NUMERICAL-APERTURE WAVEFRONTS

BACKGROUND OF THE INVENTION

1. Field of the Invention

The present invention relates to measurement of electromagnetic wavefronts. More particularly, the invention pertains to quantitative, instantaneous measurement of strongly converging optical wavefronts.

2. Description of the Related Art

Wavefront measurements are important in the manufacture of many optical components, including optical data-storage laser heads. The trend towards high-numerical-aperture laser systems for high-density storage makes wavefront measurements particularly difficult.

A conventional measurement of the wavefront quality of a light beam may employ spatial filtering of a small portion of the source light to produce a spherical reference wave that is subsequently combined with the original wavefront to produce an interferogram. As is well understood in the art, the intensity pattern generated by the interference yields fringes of constant phase difference that can be analyzed to evaluate the quality of the light beam. However, care must be taken not to introduce aberrations while dividing the original beam and recombining it with the reference beam. Therefore, these optical measurement systems must be carefully calibrated to remove artifacts from the optical paths of the beams.

This is especially important in systems that do not utilize a common optical path arrangement. In particular, for strongly converging beams, such as utilized in testing of DVD pick-up heads and of high-numerical-aperture photolithographic equipment for the semiconductor industry, a high-numerical-aperture point reference source must be generated externally to the system and used for calibration and correction of optical-path errors. Such a high-numerical-aperture point reference source is difficult to construct and maintain in proper alignment under practical manufacturing and test conditions. A system capable of producing a test wavefront and a reference wavefront from the same high-numerical-aperture source beam in a common-path arrangement would be very desirable because it would eliminate the prior-art need for an external point reference calibration source.

Common-path interferometry that takes advantage of a so-called point-diffracting element is a simple, well known configuration for measuring the quality of an optical wavefront. It was first described nearly 70 years ago by Linnik (see R. N. Smart and W. H. Steel, "Theory and Application of Point Diffraction Interferometers," Jpn. J. Appl. Phys., 14 351–356, 1975). Early common-path designs produced only a single optical interference pattern, which made it difficult to obtain quantitative information about the wavefront under test. Recently, significant research has been devoted to adapting phase-shift interferometric techniques to common-path interferometry in order to improve the precision of wavefront measurements.

Providing more than one value of phase shift between the object beam (also referred to as the test beam) and the reference beam has proven to be difficult in a common-path design. Several methods have been implemented, however, using some form of temporal phase shifting (wherein the phase shift between the reference and test waves is introduced sequentially.) For example, a liquid crystal waveplate with a microsphere point diffractor was disclosed in U.S. Pat. No. 5,689,314, and rotating waveplates and polarizers with small pinholes were described in U.S. Pat. Nos. 4,762,417 and 4,575,247. The prior art also describes using point-diffraction interferometers that have non-common paths (U.S. Pat. No. 4,744,658) and nearly common paths (U.S. Pat. No. 5,835,217).

These methods demonstrated a high degree of accuracy (on the order of one fortieth of a wavelength). Yet, they are restricted to low-numerical-aperture beams because of the limited feature size of the phase-plate. In addition, the optical thickness of the retardation and splitting elements adds aberrations that must be subtracted through calibration in order to obtain accurate measurements. Also, the temporal nature of phase-shifting techniques requires a high degree of mechanical stability of the pinhole and the interferometer with respect to the test beam during the entire acquisition time (typically, 3 to 7 video frames), thus rendering the technique particularly sensitive to vibrations.

In polarization interferometers (where the test and reference wavefronts have orthogonal polarizations), phase shifting of interferograms is accomplished by sequentially introducing a phase step between the test and reference waves (temporal phase shifting), such as with an electro-optic modulator, or by splitting the optical path into parallel channels and introducing simultaneous phase steps (spatial phase shifting). Spatial phase shifting allows data acquisition speeds that are several orders of magnitude faster than possible with temporal phase shifting, thereby providing significant vibration immunity and improved throughput.

Several methods of spatial phase shifting have been disclosed in the prior art. Smythe and Moore (1983) and Koliopoulos (1993) describe a spatial phase-shifting approach wherein a series of conventional beam splitters and polarization optics are used to produce three or four phase shifted images onto one or more cameras for simultaneous detection. Several U.S. patents (U.S. Pat. Nos. 4,575,248, 5,589,938, 5,663,793, 5,777,741 and 5,883,717) disclose variations of this method where multiple cameras are used to detect multiple interferograms. Several prior-art publications (for example, Hettwer et al., "Three channel phase-shifting interferometer using polarization-optics and a diffraction grating," Opt. Eng. 39(4), 960, 2000) and patents (U.S. Pat. Nos. 4,624,569 and 6,304,330) describe techniques wherein three or more interferograms are simultaneously imaged onto a single sensor. Other publications (U.S. Pat. Nos. 5,155,363 and 5,361,312) refer to methods where quantitative measurements can be made on a single CCD sensor by introducing a significant tilt between the reference and test wavefronts.

It is also known from the prior art that arrays of long conducting strips with periods much less than the wavelength of light can be used as polarizing elements. These arrays efficiently transmit light with polarization orthogonal to the strip direction while reflecting light with a collinear polarization (see, for example, U.S. Pat. Nos. 6,108,131, 6,122,103, 6,208,463 and 6,243,199). The planar nature of such a conducting strip structure permits using it as a polarizer over an extremely wide angle of incidence and over a broad range of wavelengths (provided that the array period remains much less than the wavelength). Earlier prior-art patents considered the effects of arrays of strips that were very long in relation to the optical wavelength of the system. However, later research (A. Jenson et al., "Finite-Aperture Wire Grid Polarizers," J. Opt. Soc. Am., December 2000, 2191–2198) showed theoretically that sub-wavelength wire-grid arrays could provide a high degree of polarization extinction even when the length of the wire structure is only on the order of half a wavelength.

It is also known from the prior art that it is possible to fabricate polarizers having a thickness of a few microns or less using thin-film nanomaterials (see U.S. Pat. No. 6,174, 394). These films have also excellent performance as a function of incident angle. Therefore, they may be used as polarizing elements in a fashion equivalent to conductive grid structures.

This disclosure illustrates how a thin polarizer arrangement (such as a sub-wavelength, conducting array pattern or a thin nanomaterial film with a finite aperture) can be used as a point diffraction filter in combination with simultaneous phase-shift interferometer configurations to produce a system capable of high-precision single-pulse measurement of wavefronts over a wide range of numerical apertures.

SUMMARY OF THE INVENTION

This invention provides novel arrangements for quantitative, instantaneous testing of optical wavefronts. The apparatus of the invention consists of a polarizing point-diffraction plate (herein referred to as a PDP) used to split an incoming wavefront into reference and test wavefronts with mutually orthogonal polarizations. These wavefronts are propagated along a common path and are combined in a variety of known configurations to produce temporally or spatially phase-shifted interference patterns. The interferograms are then analyzed in conventional manner to provide a quantitative description of the incoming wavefront. A simultaneous phase-shifting analyzer may be used to provide single-shot measurements.

According to one aspect of the invention, a conducting-grid structure with a finite-size aperture is employed as a polarizing PDP (operating in either transmission or reflection) that splits the incident wavefront into test and reference wavefronts that further propagate in common path through an interferometer. In one of the preferred embodiments of the invention, the PDP structure consists of a transparent glass substrate with a pattern that defines two distinct zones. The first, outer zone consists of an array (a rectilinear grid) of very thin conducting stripes deposited over most of the substrate with a period that is significantly smaller than the wavelength of the incident light. The second, inner zone consists of a miniature circular region of the substrate surface (located preferably near its center) that is left free of the conducting material deposited over the outer zone, thereby defining an aperture in the PDP structure.

The PDP structure is positioned in the path of the converging light beam. If operating in transmission, the central circular opening of the PDP diffracts a portion of the incident wavefront with polarization identical to that of the incident light. The outer grid zone of the structure acts as a linear polarizer, partially transmitting the incident light with a polarization perpendicular to the grid direction. As is well understood in the art, the polarizing performance of the PDP does not depend on the input state of polarization. If the input polarization is linear, the rotation of the PDP about the optical axis results in the continuous variation of the power ratio of the reference and test beams. A similar performance may be achieved in an embodiment of the invention where the PDP operates in reflection. This may be implemented, for example, by forming an appropriate thin-film coating of light-reflecting material on top of or beneath the conductive PDP substrate.

Various alternative embodiments of the polarizing PDP structure of the invention can be employed to achieve similar performance. For example, the inner (aperture) zone of the PDP can also be patterned with conducting stripes oriented perpendicularly to the direction of the grid in the outer zone. In this case, the grid in the central region of the PDP will diffract a portion of the incident wavefront while polarizing it in the direction perpendicular to the direction of polarization of the outer grid. Another possible PDP pattern could consist of an appropriately patterned inner zone and an outer zone free of conductive stripes.

According to a second aspect of the invention, the degree of transmission (or reflection) of the PDP regions may be varied in order to set the power ratio of the test and reference beams. This may be achieved by varying the duty-cycle of the grid, which is defined as the ratio of the stripe width to the period of the grid. The transmission (and reflection) of a section of the PDP can also be adjusted by depositing an appropriate uniform thin-film coating either on top of or beneath the grid structure, or by varying the depth of the grid elements.

According to still another aspect of the invention, the polarizing PDP is used in a common-path interferometric arrangement. Thus, the test and reference wavefronts from the PDP are collimated, divided into sub-wavefronts, phase-shifted, combined to produce interference, and detected along a common axis simultaneously on a single detector or a multiple detector array such as described, for example, in U.S. Pat. No. 6,304,330. The beams can also be detected sequentially on a single detector array, if desired.

According to another preferred embodiment of the invention, particularly useful for ultraviolet wavelengths, the PDP polarizer is implemented using thin films of polarizing nanomaterial, preferably less than a few microns in thickness, disposed over a transparent substrate. The films are used in a fashion equivalent to the metallic grids described above to produce orthogonal polarization of the test and reference wavefront, which are then propagated along a common path.

Thus, a benefit of the invention is that it provides a means for measuring a converging wavefront, with path-length-equivalent accuracy of a fraction of wavelength, without the use of a point reference source, as required for calibration of prior-art systems. The orthogonally polarized test and reference beams are produced in a common-path configuration without restriction on the numerical aperture or the wavelength of the input light. The beams are combined in an interferometer with a geometry that maintains their common path through the entire system and allows the simultaneous detection of interferograms on a single detector or a plurality of adjacent detectors. The ratio of power between the test and reference wavefronts may be changed without significant power loss while maintaining high polarization purity in each beam. The invention also provides a high degree of polarization of the test and reference wavefronts independently of the input polarization state and for a large range of wavelengths of the input wavefront.

Other features and advantages of the invention will become apparent to those skilled in the art from the following detailed description taken in conjunction with the accompanying drawings and claims.

BRIEF DESCRIPTION OF THE DRAWINGS

FIG. 2C is a schematic view of an alternative exemplary embodiment of the polarization point diffraction plate of the invention.

FIG. 2D is a schematic view of another exemplary embodiment of the polarization point diffraction plate of the invention.

DETAILED DESCRIPTION OF THE INVENTION

In general, the invention lies in the combination of an interferometer with a polarizing PDP, as described, wherein common-path test and reference wavefronts are produced. The wavefronts are collimated, phase shifted and interfered, and the resulting interferograms are imaged on a detector. The interference patterns are then processed using any number of algorithms designed to calculate optical difference and determine the input wavefront.

The invention is particularly suited for measuring high-numerical-aperture converging beams. Such a convergent beam is first transformed by passing the light through a specially made polarization plate that produces a high-quality spherical reference wave in common path with a replica of the original test wavefront, which are polarized in mutually orthogonal directions. A variety of methods can then be used to impart a phase shift between the reference and test beams and effect quantitative interferometric measurements. For example, in one preferred embodiment, a simultaneous phase-shift system (in spatial phase-shift configuration) is used to accomplish fast measurement within a single video frame. Another implementation employs a spatial-frequency carrier method where an interferogram is generated and detected on a single detector. Another, equivalent solution is to employ a temporal phase-shifting device, such as an electro-optic modulator, to generate sequential frames of phase-shifted interferograms.

Figure 1A:
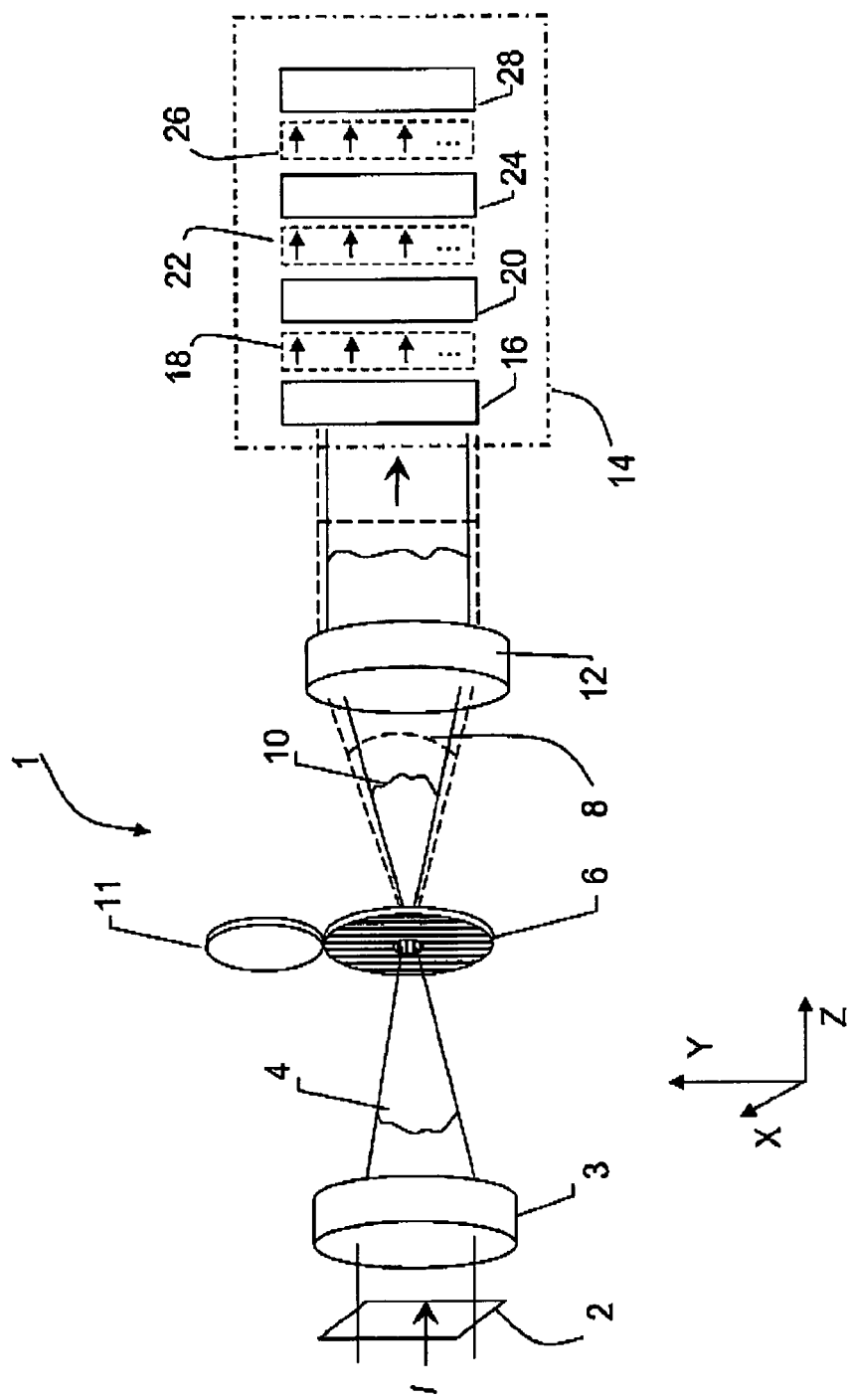
FIG. 1A is a schematic view of a measurement apparatus according to the invention configured to operate in transmission.

Referring to the drawings, wherein the same numerals and symbols are used throughout to refer to like parts, a wavefront measurement device 1 exemplifying the principles of the invention is shown in FIG. 1A. An input light I is received for testing through an entrance pupil 2 and a test wavefront 4 is produced by an objective lens system 3 (which may consist of multiple elements) by focusing the light I onto a polarizing point diffraction plate 6. The light I may be narrow or broadband. The PDP is typically positioned perpendicular to the direction of light propagation (illustrated in the figures by the positive direction of the orthogonal axis z) and is used to produce two mutually orthogonal, polarized output wavefronts that propagate along a common path. The first wavefront 10 (also referred to hereafter as the test wavefront) is a copy of the test wavefront 4. The second wavefront 8 is a spherical beam used as a reference wavefront because of its orthogonal polarization with respect to the test wavefront. A mechanism 11 may be coupled to the PDP to enable its rotation about the optical axis and, if the input polarization is linear, change the power ratio of the reference and test beams.

A lens system 12 collimates both the reference and test wavefronts 8,10 and delivers them to a polarization phase-shifting interferometer 14, which may be implemented in any of the several temporal or spatial phase-shift configurations known in the art. In general, the interferometer 14 is used to subject the reference and test wavefronts to four sequential processing steps while retaining their common path. The first step, occurring in a splitting/imaging section 16 of the interferometer, produces a plurality of copies 18 of the reference and test wavefronts using refractive, diffractive and/or reflective optical splitters. The second step utilizes a phase-shifting section 20 to impart different relative phase shifts between the copies 18 of the reference and test wavefronts. In the next step, carried out in an interference section 24, the phase-shifted copies 22 of the reference and test wavefronts are combined to produce interferograms 26 through interaction with a polarizing element. Finally, in the final step, a detector section 28 with a plurality of photodetectors is used to spatially sample the resulting interferograms.

Figure 1B:
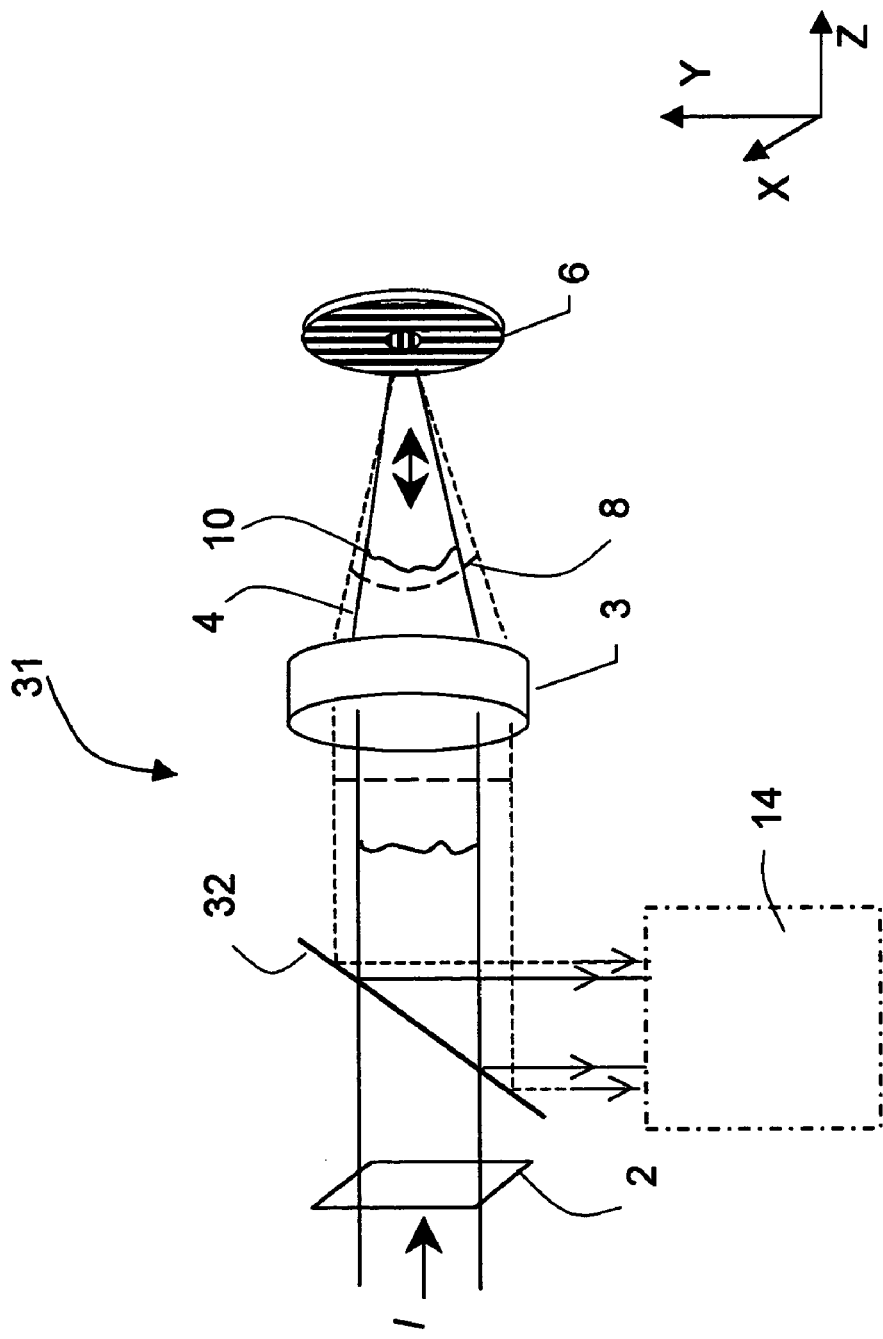
FIG. 1B is a schematic view of a measurement apparatus of the invention configured to operate in reflection.

As illustrated in FIG. 1A, the wavefront measurement device 1 is configured so as to utilize the PDP 6 in transmission mode, where the reference and test wavefronts 8,10 emerge from the opposite side of the wavefront 4 incident on the PDP. A different exemplary arrangement is illustrated in the device 31 of FIG. 1B, where the PDP 6 is utilized in reflection mode. In this configuration, the PDP produces the spherical reference wavefront 8 and the test wavefront 10 in reflection back towards the lens 3 along the negative z axis. Accordingly, the test wavefront 10 and its replica spatially overlap between the lens 3 and the PDP. Both the reference and test wavefronts 8,10, collimated by the lens 3, are re-directed by an appropriately placed beamsplitter 32 towards the polarization phase-shifting interferometer 14 positioned on the side.

Figure 1C:
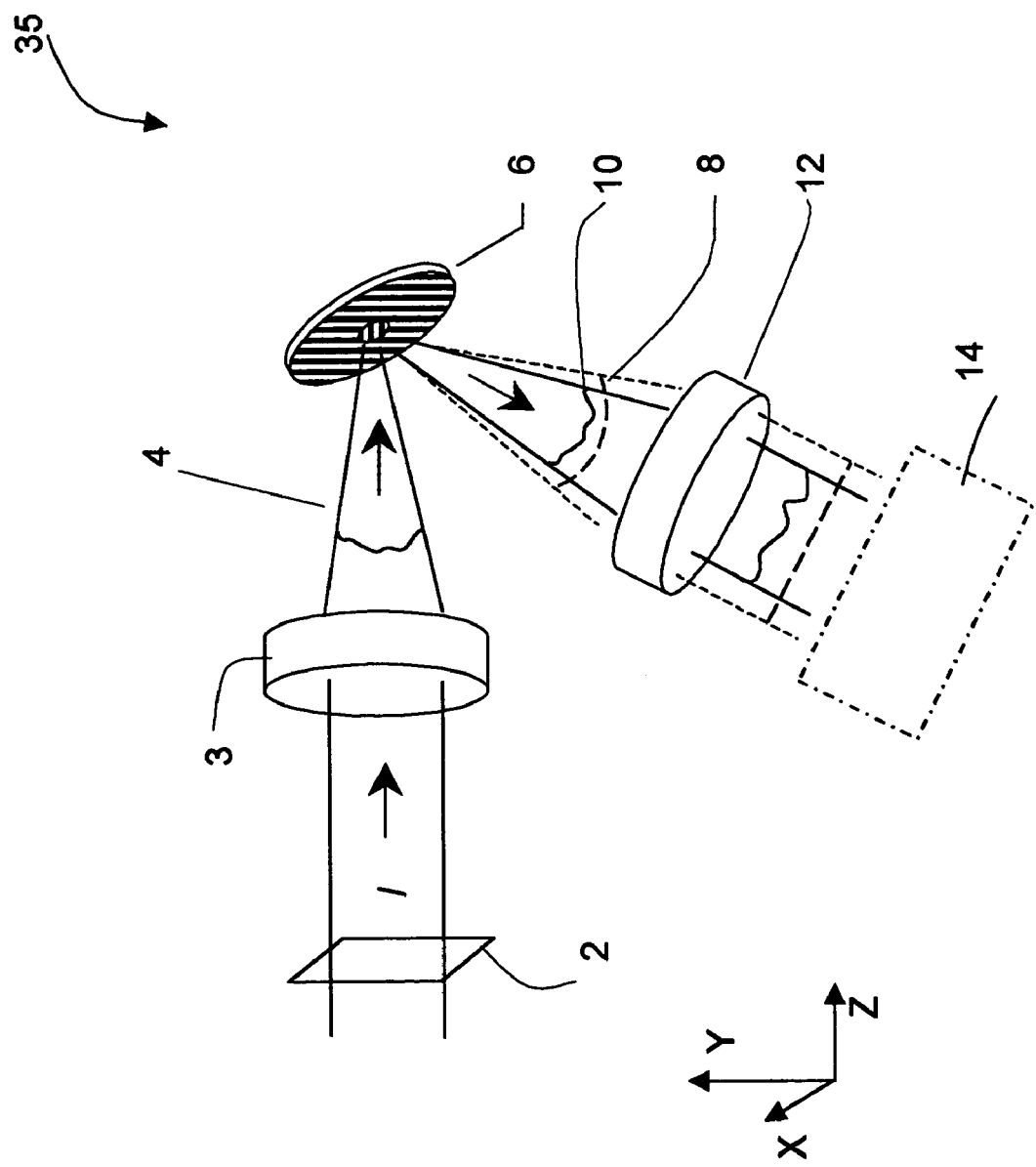
FIG. 1C is a schematic view of another embodiment of the invention configured to operate in reflection.

Another alternative embodiment 35 of a wavefront measurement device operating in reflection is shown in FIG. 1C. Here, the PDP 6 is placed at an appropriate tilt angle with respect to the direction of propagation of the input light (+z axis) so as to form and re-direct the wavefronts 8 and 10 in reflection towards the collimating lens 12 and the interferometer 14.

Figure 1D:
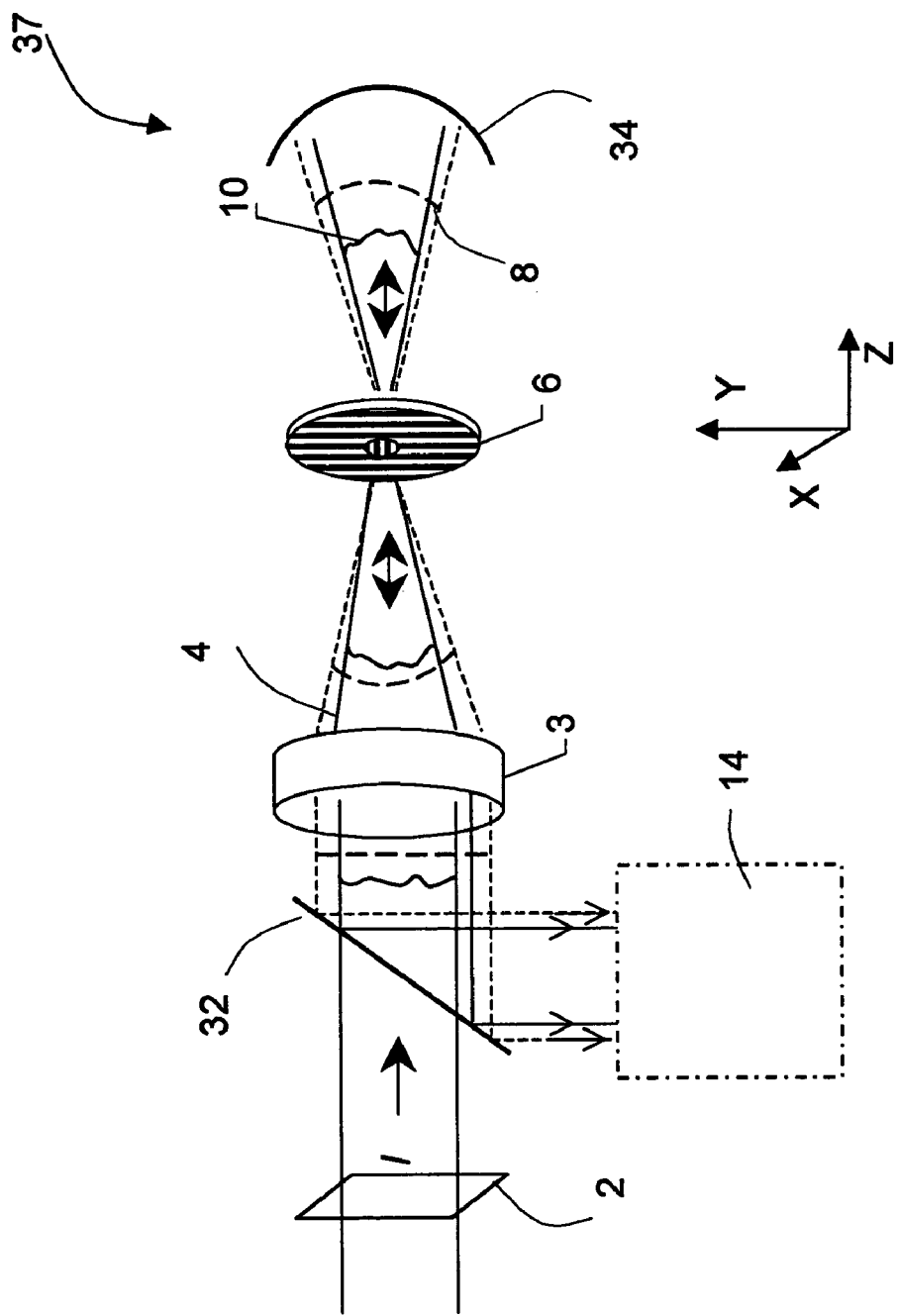
FIG. 1D is a schematic view of an embodiment configured to operate in combined mode.

FIG. 1D shows yet another embodiment 37 of the invention operating in a combined transmission-reflection mode utilizing a transmissive PDP and a mirror. The reference and test wavefronts 8,10 are produced from the incident wavefront 4 in transmission through the PDP 6 as described above with reference to FIG. 1A. A spherical mirror 34, appropriately positioned along the z-axis, is used to reflect both wavefronts 8,10 and cause them to traverse the PDP for a second time. The collimation lens 3 and a beamsplitter 32 are then used to deliver both wavefronts to the interferometer 14, as in the case of the device 31 of FIG. 1B.

Figure 2B:
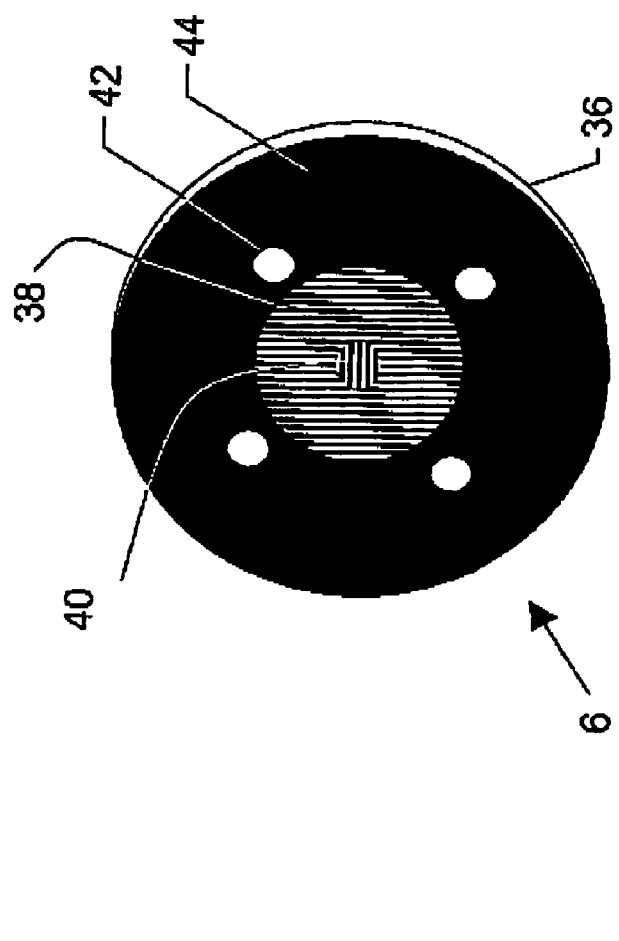
FIG. 2B shows the polarization point-diffraction plate of the invention with reference fiducials to assist in the optical alignment of the measurement apparatus.
Figure 2A:
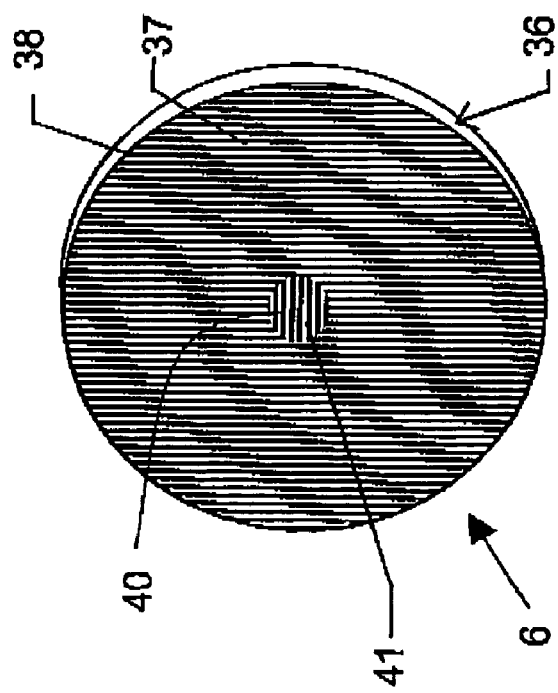
FIG. 2A is a schematic view of an exemplary embodiment of the polarization point-diffraction plate of the invention.

FIGS. 2A through 2C provide examples of various conductive-grid embodiments of the polarization PDP 6 of the invention. As shown in FIG. 2A, this type of PDP comprises a partially transparent, typically thin, polished glass substrate 36. An array of fine conductive strips 37, having a period and thickness much less than the optical wavelength of the light measured by the system, is appropriately patterned using conventional methods in an outer zone 38 on one side of the substrate 36. In addition, a circular, diffracting inner region 40 is created near the center of the substrate by similarly depositing fine conducting strips 41 that are oriented perpendicular to the strips 37 in the outer region 38. The diameter of the circular region 40 is ideally equal to half the Airy disk diameter, or $(0.61\lambda)/NA$, where $\lambda$ is the optical wavelength and NA is the numerical aperture of the test wavefront 4 incident upon the PDP, as shown in FIG. 1.

Using this embodiment of the PDP, the reference wavefront 8 and the test wavefront 10 produced thereby are polarized orthogonal to each other. If the PDP is used to operate in transmission, its transmission characteristic can be adjusted by varying both the duty cycle and the thickness of the fine conductive strips in the zone 38 according to well-understood principles in the art of gratings. Because the diffracting circular region 40 only intercepts a small portion of the focused wavefront 4 (FIG. 1), the transmission of the outer region 38 should be reduced to equalize the energy contained in the spherical reference wave 8 and in the test wave 10. Thus, the transmission of the zone 38 may be modified conventionally by the addition of a uniform thin-film coating of light-absorbing or light-reflecting material on either side of the substrate (and on top of or underneath the strips). Typically, an overall optical density of 0.5–2.0 will produce the desired result of equally matched amplitude between the reference and test beams. As mentioned above, the power ratio of the reference and test beams may also be adjusted by rotating the PDP with an appropriate mechanism 11, as show in FIG. 1A.

The polarization PDP plate may also contain registration marks (fiducials), such as transparent or opaque lines, polygons or circles, to aid in the optical alignment of the PDP with respect to the test wavefront. FIG. 2B shows an example of fiducial marks 42 patterned within an opaque region 44 on the PDP.

In the PDP embodiment of FIG. 2C, the outer zone 38 does not have any patterning. Under this condition, the test wavefront 10 will maintain the polarization of the original wavefront 4. Thus, this PDP configuration does not ensure the orthogonal polarization requirement for the reference and test beams 8,10. However, a reasonable approximation to this requirement can be obtained if the polarization of the input beam 4 is highly elliptical or linear, with its major polarization axis oriented nearly parallel to the strips 41. Also, the relatively simple implementation of this PDP design provides a reasonable practical alternative to the strict production tolerances associated with the design of FIG. 2A.

In a third PDP embodiment, shown in FIG. 2D, the reverse combination of polarizing regions is implemented. The outer zone 38 of the PDP is patterned, while the inner zone 40 is not. In this case, the reference wavefront 8 is polarized identically to the original wavefront 4. As for the embodiment of FIG. 2C, although this configuration does not ensure polarization orthogonality between the reference and test wavefronts, a reasonable approximation can be obtained if the input polarization is highly elliptical, or linear, and its polarization axis is oriented nearly parallel to the strips in region 38. This type of PDP element is also easier to produce than that of FIG. 2A.

Figure 2E:
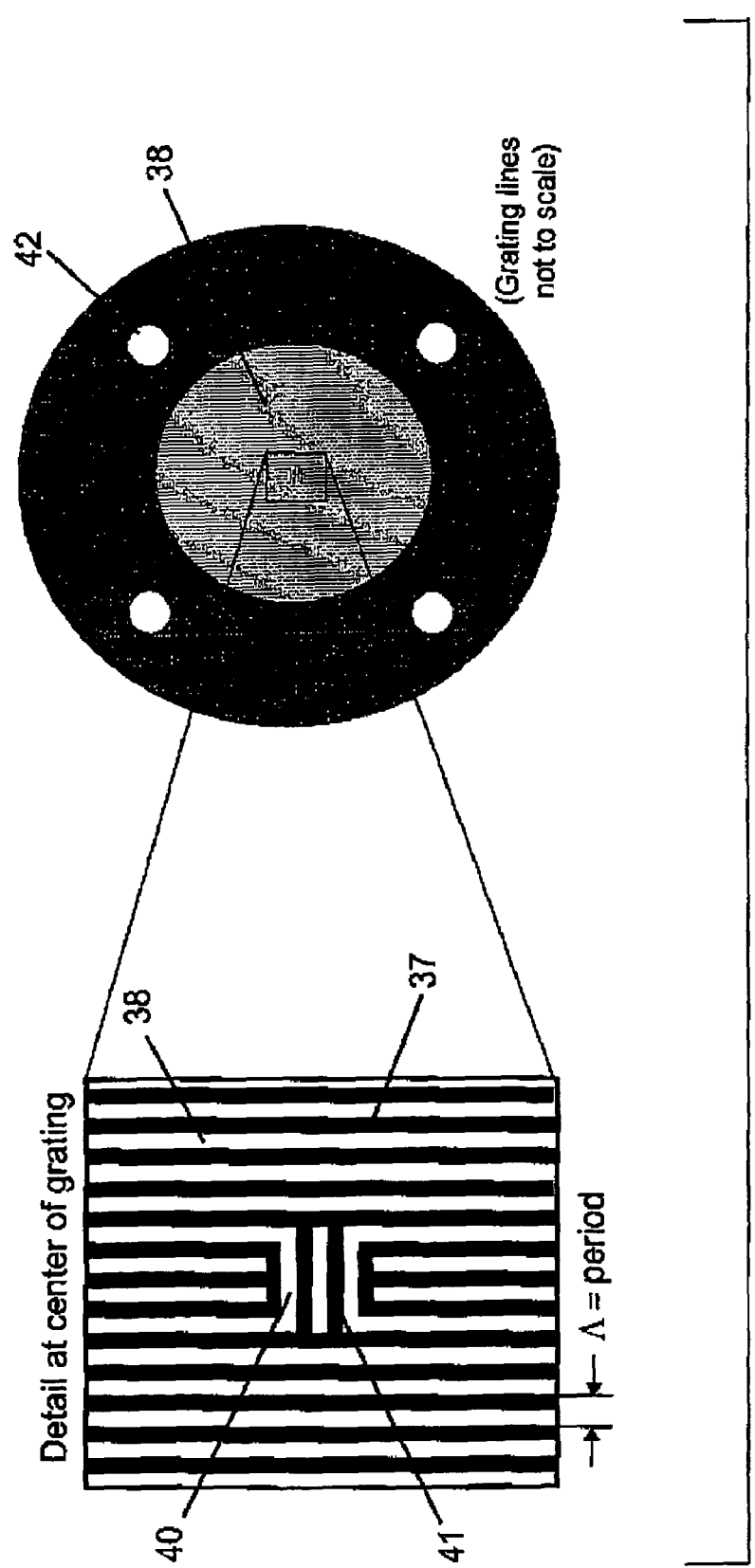
FIG. 2E shows a preferred embodiment of the polarization point-diffraction plate of FIG. 2B illustrating the details of manufacture of the grating lines forming the inner and outer zone grids of conductive strips.

In the preferred conductive-grid embodiment of the invention, the PDP consists of a cross-grating structure wherein the outer and inner zones 38,40 are produced using only rectangular stripes 37,41 disposed perpendicularly to each other, as illustrated in FIG. 2E. Each stripe consists of a 25–75 nm wide strip of 100-nm thick aluminum or chrome material on a transparent substrate about 100-µ thick. It is noted that the substrate thickness in not critical to the performance of the PDP, but it is used in some applications to compensate for other system parameters. The strips 37,41 are preferably formed with a period not larger than about $\lambda/3$. The diameter of the inner zone 40 is preferably about ½ the Airy disk diameter of the incident wavefront. Such a structure can be machined conventionally with an ion milling machine or by lithographic masking and wire grid deposition techniques. Both the period and the thickness of the stripes can be modified to vary the duty-cycle of the grid, as necessary to achieve a particular performance.

In a different implementation of the wire-grid PDP of the invention (not shown), its conductive pattern or patterns may be sandwiched between two optically thin substrates, which generally may also possess different optical properties. The sandwiched embodiment provides a safe solution to implement these configurations without exposing the polarizing elements to wear and tear. In practice, the PDP is positioned with its substrate either facing towards the incident light or away from it to satisfy optomechanical system requirements. For example, the PDP may concurrently also perform the function of cover glass compensation when testing optical recording heads. This would require the patterning to be placed away from the incident light and the substrate thickness to match the design of the system under test. For example, DVD laser heads are designed to work with a cover-glass thickness of approximately 0.7 mm, and new generation blue-ray optical recorders with a cover glass 0.1-mm thick.

Figure 2F:
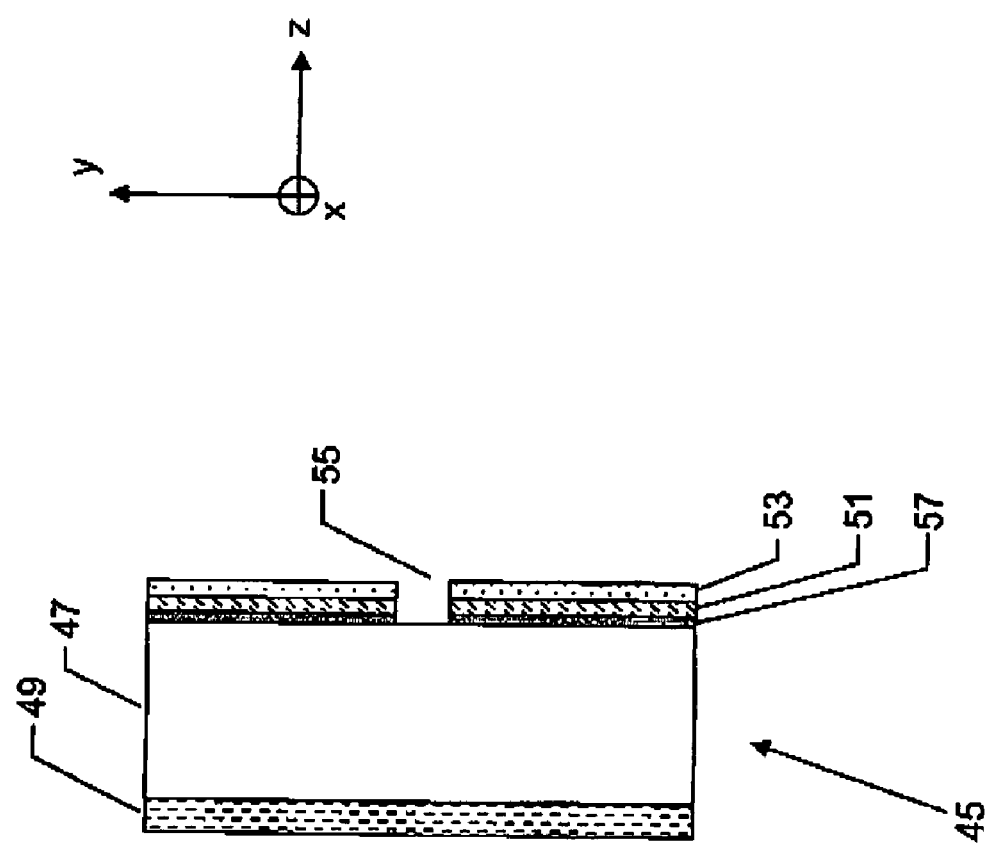
FIG. 2F is a schematic view of another exemplary embodiment of the polarization point-diffraction plate of the invention wherein the polarizing effect is produced by thin nanomaterial films.

FIG. 2F illustrates an equivalent PDP embodiment 45 fabricated using a combination of several layers of oriented thin films with polarizing properties. Nanomaterials, both in crystalline and amorphous form (for example, the polarizing solution sold by Sterling Optics, Inc., of Williamstown, Ky., under the trademark POLARCOAT), are deposited and oriented over a substrate 47 to provide polarizing properties. Accordingly, an input thin-film polarizer 49 is disposed on the input face of the PDP such that its transmitted polarization axis is aligned along the y-axis (for example), as indicated in the figure. The input polarizer 49 may be unnecessary, if the input light is already well polarized and the device is aligned to coincide with the polarization axis correctly.

Ideally, the polarized wavefront yielded by the input polarizer 49 would subsequently be rotated 90 degrees, such as with a quarter-wave plate, to produce an orthogonally polarized output beam emitting from a portion of the plate. In practice, the dimensional constraints of the PDP of the invention favor its implementation with thin-film embodiments. Accordingly, a polarization rotation layer 51 is disposed on the back side of the substrate 47 to initially rotate the transmitted light from the input polarizer such that it has a substantial component along the x-axis. The layer 51 may be a thin birefringent waveplant or a linear polarizer, where the respective axes of each material are oriented at some angle, alpha, in the x,y plane. Optimally, alpha is equal to 45 degrees for a linear polarizer or for a half-wave birefringent plate. An output polarizer 53 is then disposed directly on top of the polarization rotation layer 51, or separated by a thin buffer layer (not shown), and is oriented along the x-axis. A diffracting pinhole 55 is machined (using a focused ion beam, for example) or is otherwise introduced into both the polarization rotation layer 51 and output polarizer 53. Thus, the reference wavefront is polarized along the axis of the input polarizer and the test wavefront is polarized along the axis of the output polarizer. Because the input and output polarizers have high contract over a wide wavelength range, the device will maintain high contrast independent of any dispersion that may be present in the polarization rotation layer 51. The PDP embodiment 45 of FIG. 2F has the advantage of maintaining a high polarization contrast ratio between the reference and test wavefronts over a wide wavelength range and regardless of the input polarization state.

There is essentially no restriction on the thickness of the input polarization layer 49. It could even be impregnated throughout the substrate 47 over a thickness ranging from sub-micron to millimeters. On the other hand, the combined thickness of the polarization rotation layer 51 and the output polarization layer 53 should be less than the quantity $1.5\lambda/(NA)^2$, where $\lambda$ is the wavelength of the light and NA is the numerical aperture of the system under test. Thus, for the purposes of this disclosure, a layer or a combination of layers used as a point diffracting element is considered a thin film if it is less than $1.5\lambda/(NA)^2$. An optional thin-metal layer 57 may also be placed between the back side of the substrate 47 and the polarization rotation layer 51 to control the transmission around the outside of the diffracting pinhole 57. The metallic layer 57 may also be used to provide additional electrical conductivity during the pinhole drilling process, which could be performed, for example, using a focused ion beam. It is noted, though, that this layer may not be necessary depending on the transmission of the exit polarizer 53 and the method used for producing the pinhole. Finally, a very thin buffer layer (in the order of 0.1–0.2 microns and, for example, made of $SiO_2$) may also be placed between the polarization rotation layer 51 and the output polarizer 53 in order to allow orientation of the output polarizer independent of the polarization rotation layer and to avoid any material incompatibility.

In the preferred embodiment of the thin-film polarizer of FIG. 2F, the substrate 47 is glass about 100-µm thick (not critical, as explained above); the input thin-film polarizer 49 consists of a 0.5-µm thick polarization layer (such as sold by Codixx of Barleben, Germany, under the trademark COLOPOL) oriented at 0 degrees in the x-y plane; the polarization rotation layer 51 is 0.1-µm thick and consists of a wire-grid polarizer (such as sold by Moxtek, Inc., of Orem, Utah) oriented at 45 degrees in the x-y plane; and the output polarizer 53 consists of a similar 0.1-µm thick wire-grid layer oriented at 90 degrees in the x-y plane. The PDP may also include a 50-angstrom thick layer 57 of unpatterned aluminum, as illustrated in the figure, and a 0.1–0.2 µm buffer layer of $SiO_2$ between layers 51 and 53 (not shown). The point-diffracting hole, of size between 0.2 µm and 20 µm (depending on the numerical aperture of the test wavefront, as described above), is fabricated using focused ion bean milling from vendors such as FIB International of Santa Clara, Calif.

Figure 3:
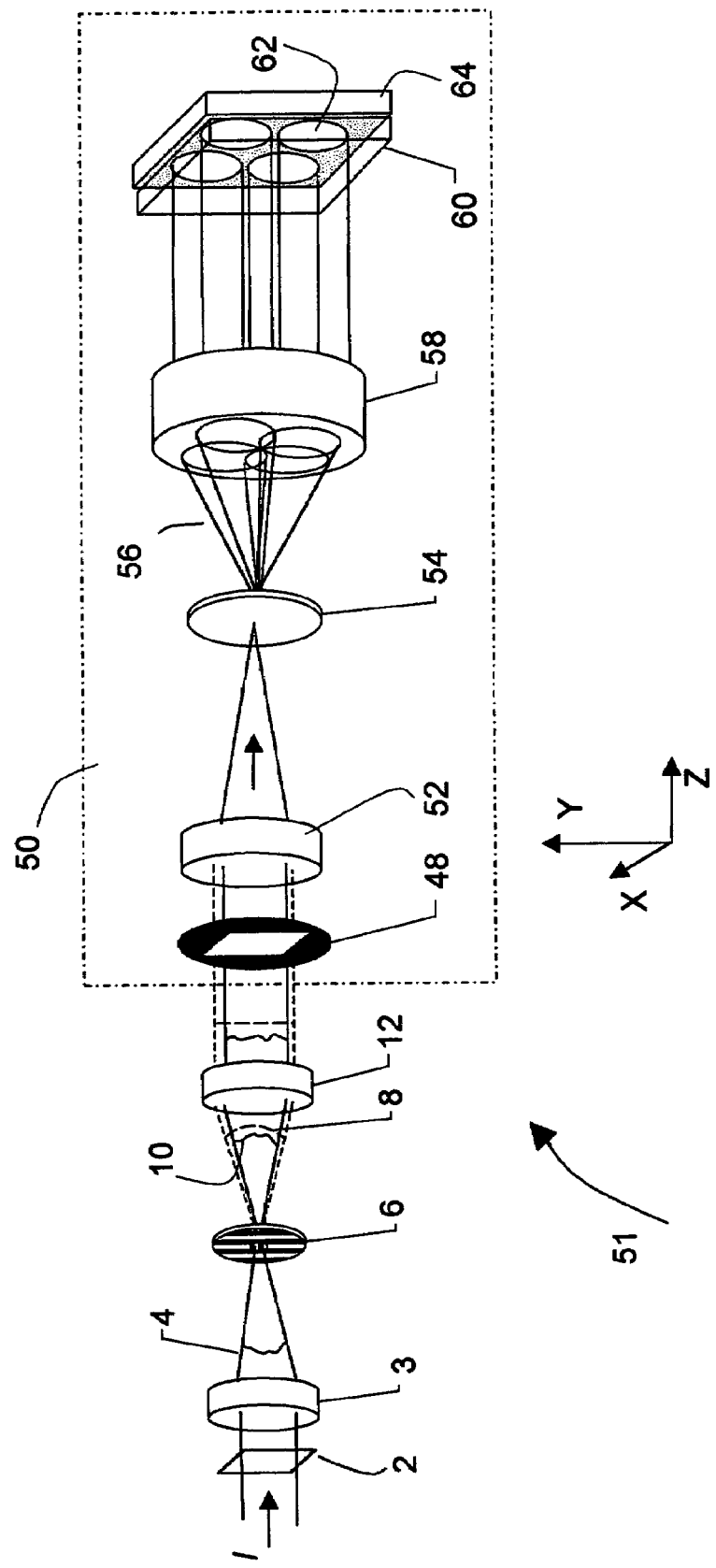
FIG. 3 is a schematic view of an exemplary embodiment of a wavefront measurement apparatus configured to incorporate a diffraction-based simultaneous phase-shifting interferometer.

FIG. 3 illustrates a measurement system 51 that includes a polarization point diffraction plate 6 and a simultaneous (spatial) polarization phase-shifting interferometer 50. The reference wave 8 and test wave 10, generated in transmission through the PDP 6 in the fashion described above, are focused by a lens 52 onto an appropriately positioned beamsplitter element 54. The beamsplitter, through reflective, refractive or diffractive elements, produces a plurality of sub-image beam pairs 56 (reference plus test) which are collimated and imaged by a lens 58 through a phase interference plate 60 onto a detector 64. It is noted that the reference and test sub-image beams in each beam pair 56 maintain the common path of the original beams 8,10. The plate 60 phase shifts and appropriately overlaps the collimated sub-image waves, thereby delivering phase-shifted interferograms 62 on the detector 64. The plate 60 comprises substantially planar birefringent waveplates and polarizing elements arranged in parallel and/or adjoining layers, as is known in the art.

The entrance region of the interferometer 50 incorporates a field stop 48 that is conjugate with an input pupil image plane 2 and the plane of detector 64. The purpose of the field stop 48 is to limit overlap between sub-images on the detector. The detector 64 is typically a pixilated array that allows high-resolution digital sampling of the phase-shifted interferograms. The digitized interferograms are then processed by a computer in conventional manner to calculate aberrations in the test wavefront using one of the many well known algorithms for phase determination. In the case of a four channel detector, for example, the phase may be determined by the relation $\phi=Atan[(I_4-I_2)/(I_1-I_3)]$, where $I_i$ is the intensity measured in an $i^{th}$ detector channel.

Figure 4:
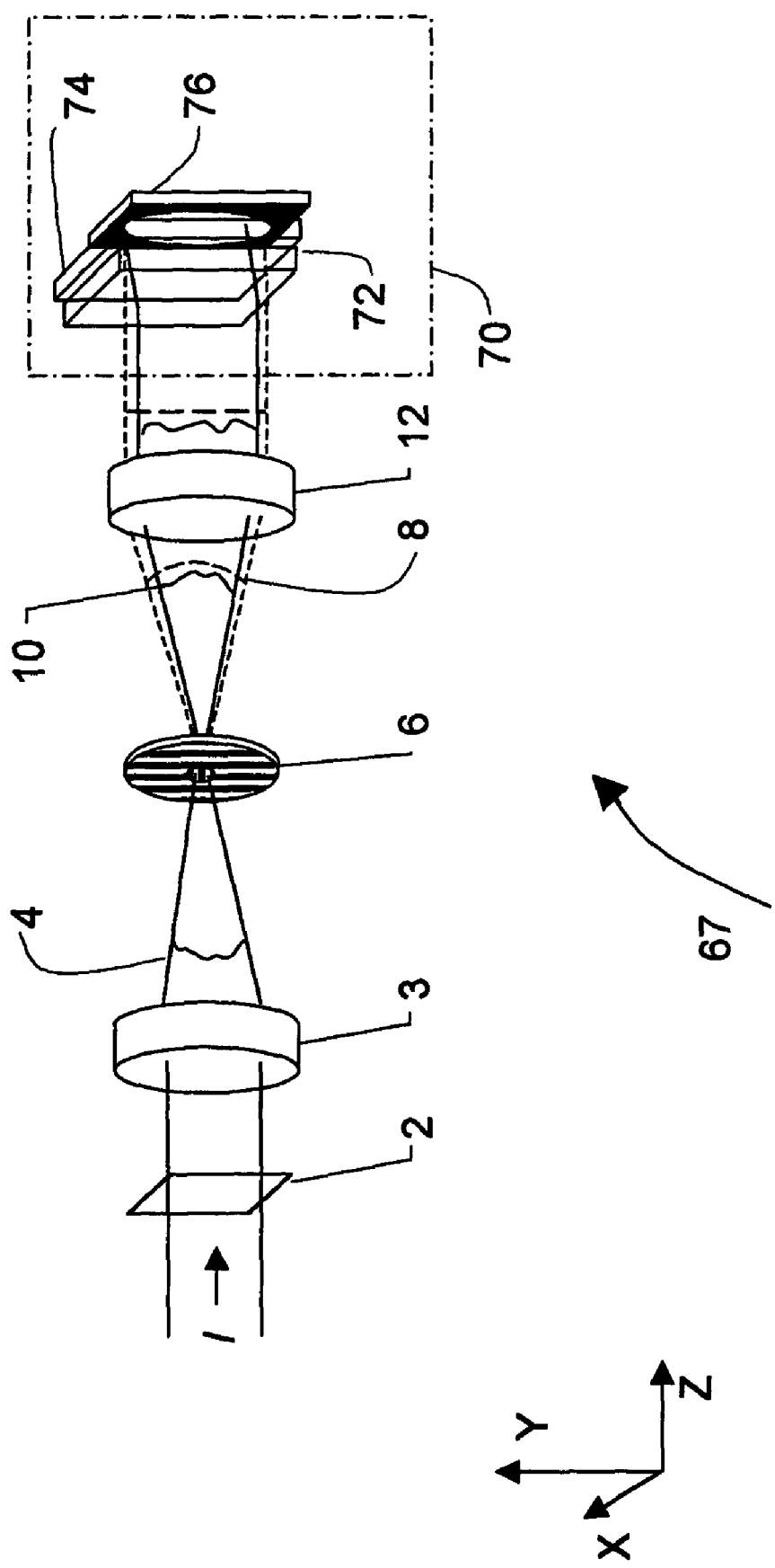
FIG. 4 is a schematic view of an exemplary embodiment of a wavefront measurement apparatus with a polarization phase-shifting interferometer.
Figure 5:
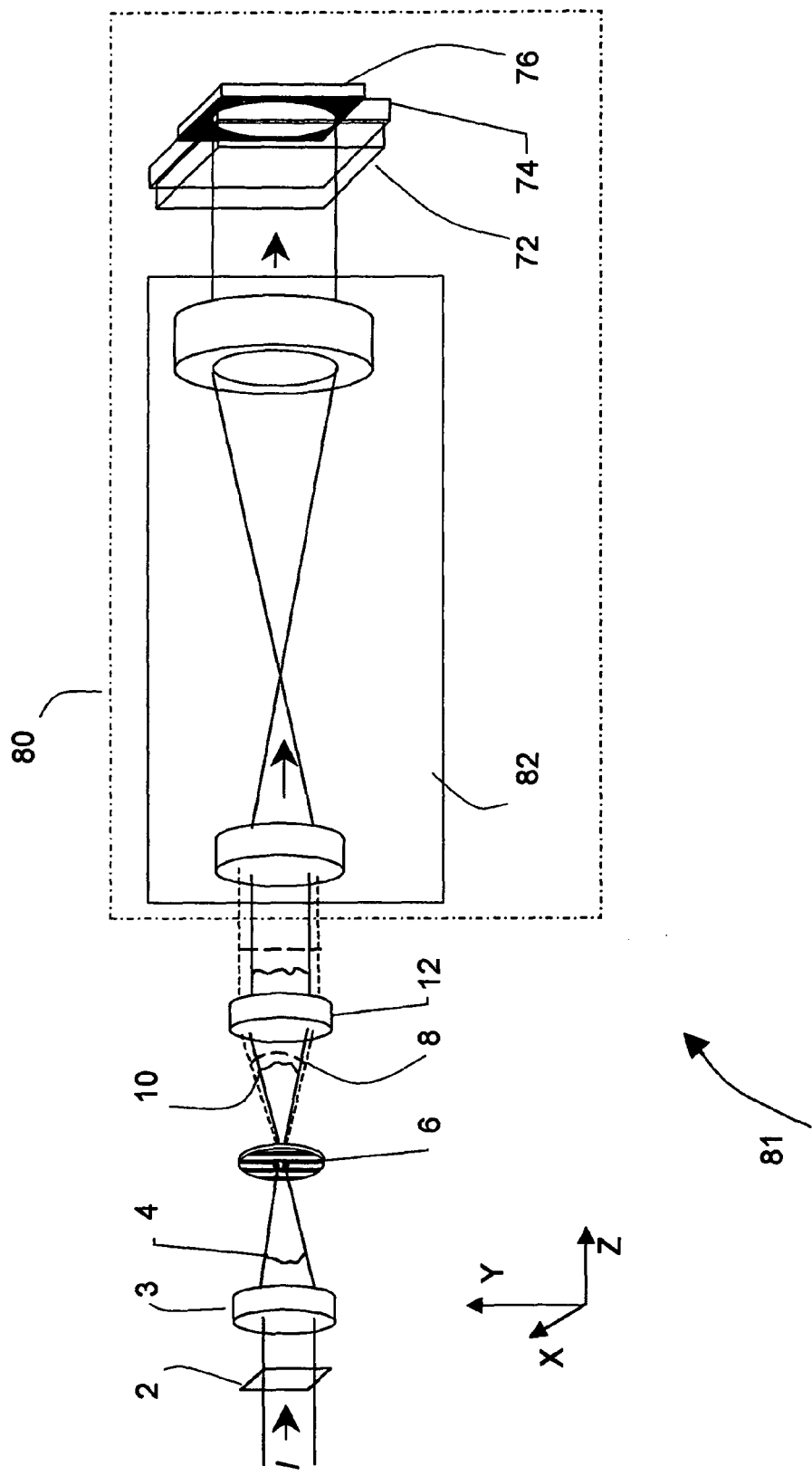
FIG. 5 is a schematic view of an exemplary embodiment of a wavefront measurement apparatus including a telescope to relay the test and reference wavefronts to the interferometer.

Another embodiment 67 of the invention, shown in FIG. 4, combines the polarization PDP 6 with a polarization spatial phase-shifting interferometer 70 which employs a spatial-frequency carrier method of detecting the phase variations in the test wavefront. The reference and test waves 8,10 are generated by the PDP 6 as described with reference to FIG. 1, then they are collimated by the lens 12 and directed to a polarization element 72 (which may be a birefringent crystal, such as a Wollaston prism, or any other refractive or diffractive component) inside the interferometer 70. The element 72 acts as a polarization beamsplitter, thus introducing an angular separation between corresponding wavefronts. The waves are then interfered by a polarizer 74 and imaged on a single detector 76. The contrast of the corresponding interferograms can be adjusted by rotating the polarizer 74 to compensate for arbitrary polarizations of the imaged reference and test waves and to eliminate the need to adjust the transmission of the outer patterned zone of the PDP 6. The digitized interferogram is further processed by computer to calculate aberrations of the test wavefront using one of the many well-known algorithms for separating the slowly varying phase envelop from the high spatial carrier frequency (see, for example, D. Malacara et al., "Interferogram Analysis for Optical Testing," Chap. 8, Whiley Interscience, New York, 1998). The implementation of this interferometer could also include a telescope assembly 82, as illustrated in the arrangement 81 of FIG. 5. The telescope is used to relay the collimated reference and test waves 8,10 entering the interferometer and to appropriately image them onto the detector 76.

It is clear that a significant advantage of the invention lies in the ability to test strongly converging, high-numerical-aperture light sources without the need to calibrate the system with a point reference source. This is achieved with a polarization diffraction plate with gratings that enable the formation of common-path reference and test beams. As illustrated in all embodiments, the reference and test wavefronts travel through the PDP and the interferometer along a single common path. Although the copies 18 of the reference and test wavefronts may be separated from each other in the polarization phase-shifting section of the interferometer, this separation does not introduce any measurement error unless there are birefringent aberrations in the path because the test and measurement beams in each channel travel a common path. Thus, the need for calibration to correct systematic wavefront aberrations, which is a problem in prior-art systems that operate on large-numerical-aperture converging incident light, is eliminated.

When the input light I passes through a lens prior to forming a high-aperture converging wavefront, as illustrated in FIG. 1A, the system measures a combination of the aberrations in the input wavefront itself and the aberrations introduced by the lens. In some cases such a measurement may be desirable; for example, in optical data storage applications. It is still possible, however, to measure inherent aberrations of the input wavefront alone as they appear prior to interaction with the lens. That is accomplished by taking an independent measurement of the aberrations introduced by the lens by illuminating the lens with a plane wave. As is well understood in the art, a plane wave can be approximated with the use of high-quality low-numerical-aperture optics. The lens aberrations are then subtracted from subsequent wavefront measurements to provide a net figure for the input wavefront aberrations. Such a procedure permits the measurement of the characteristics of unknown collimated wavefronts or of phase aberrations introduced at an entrance pupil image plane (in practice, the latter situation occurs, for example, when measuring a wavefront that has traversed an atmospheric turbulence).

Various other changes in the details, steps and components that have been described may be made by those skilled in the art within the principles and scope of the invention herein illustrated and defined in the appended claims. For example, aluminum and chrome have been disclosed for the strips 37,41 of the invention, but any other conductive material could be used for particular applications, such as gold, nickel and copper. Similarly, nanomaterials have been disclosed as thin-film polarizing materials, but other polarizing materials can be used in equivalent fashion provided that they are suitable for application in thin films and have good polarization contrast (at least 10:1).

Therefore, while the present invention has been shown and described herein in what is believed to be the most practical and preferred embodiments, it is recognized that departures can be made therefrom within the scope of the invention, which is not to be limited to the disclosed details but is to be accorded the full scope of the claims to embrace any and all equivalent methods and products.

We claim:

1. An interferometric measurement device for characterizing an input wavefront comprising a polarizing point-diffraction plate positioned along an optical axis of the device, wherein the plate includes two regions and one of the regions includes a first polarizing element adapted to split the input wavefront into a reference wavefront and a test wavefront with mutually orthogonal polarizations; and wherein the other of said two regions includes a second polarizing element perpendicular to the first polarizing element.

2. The interferometric measurement device of claim 1, further comprising an optical coating to modify an optical property of the plate.

3. The interferometric measurement device of claim 1, further comprising a means for changing a relative position between a source of said input wavefront and the plate to modify a power ratio of the test and reference beams.

4. The interferometric measurement device of claim 1, further comprising a phase-shifting interferometer that includes a spatial phase-shifting section to impart different relative spatial phase shifts between said reference and test wavefronts, an interference section to combine the spatially phase-shifted reference and test wavefronts to produce a corresponding interferogram, and a detector section to spatially sample the interferogram.

5. The interferometric measurement device of claim 4, wherein the splitting section includes an optical splitter and the phase-shifting and interference sections consists of a phase interference plate.

6. The interferometric measurement device of claim 1, further comprising a phase-shifting interferometer that includes a temporal phase-shifting section to impart different relative temporal phase shifts between the reference and test wavefronts, an interference section to combine the temporally phase-shifted reference and test wavefronts to produce corresponding interferograms, and a detector section to temporally sample the interferograms.

7. The interferometric measurement device of claim 1, further comprising a phase-shifting interferometer that includes a splitting section to produce a plurality of copies of the reference and test wavefronts, a spatial phase-shifting section to impart different relative spatial phase shifts between said copies of the reference and test wavefronts, an interference section to combine phase-shifted copies of the reference and test wavefronts to produce corresponding interferograms, and a detector section to spatially sample the interferograms.

8. The interferometric measurement device of claim 1, further comprising a field stop incorporated within an entrance region of the interferometric measurement device, said field stop being conjugate with an input pupil image plane and with a plane of a detector in the device.

9. The interferometric measurement device of claim 1, further comprising means for changing a relative position between a source of said input wavefront and said polarizing point-diffraction plate.

10. The interferometric measurement device of claim 1, wherein said first polarizing element includes a grating.

11. The interferometric measurement device of claim 1, wherein said first and second polarizing elements include a grating.

12. The interferometric measurement device of claim 1, wherein the polarizing point-diffraction plate is a cover glass for the interferometric measurement device.

13. An interferometric measurement device for characterizing an input wavefront comprising a polarizing point-diffraction plate positioned along an optical axis of the device, wherein the plate includes two regions and one of the regions includes a first polarizing element adapted to split the input wavefront into a reference wavefront and a test wavefront with mutually orthogonal polarizations; and wherein said one region is circumscribed by the other of said two regions of the plate.

14. The interferometric measurement device of claim 13, further comprising an optical coating to modify an optical property of the plate.

15. The interferometric measurement device of claim 13, further comprising a means for changing a relative position between a source of said input wavefront and the plate to modify a power ratio of the test and reference beams.

16. The interferometric measurement device of claim 13, further comprising a phase-shifting interferometer that includes a spatial phase-shifting section to impart different relative spatial phase shifts between said reference and test wavefronts, an interference section to combine the spatially phase-shifted reference and test wavefronts to produce a corresponding interferogram, and a detector section to spatially sample the interferograms.

17. The interferometric measurement device of claim 13, further comprising a phase-shifting interferometer that includes a splitting section to produce a plurality of copies of the reference and test wavefronts, a spatial phase-shifting section to impart different relative spatial phase shifts between said copies of the reference and test wavefronts, an interference section to combine phase-shifted copies of the reference and test wavefronts to produce corresponding interferograms, and a detector section to spatially sample the interferograms.

18. The interferometric measurement device of claim 17, wherein the splitting section includes an optical splitter and the phase-shifting and interference sections consists of a phase interference plate.

19. The interferometric measurement device of claim 13, further comprising a phase-shifting interferometer that includes a temporal phase-shifting section to impart different relative temporal phase shifts between the reference and test wavefronts, an interference section to combine the temporally phase-shifted reference and test wavefronts to produce corresponding interferograms, and a detector section to temporally sample the interferograms.

20. The interferometric measurement device of claim 13, further comprising a field stop incorporated within an entrance region of the interferometric measurement device, said field stop being conjugate with an input pupil image plane and with a plane of a detector in the device.

21. The interferometric measurement device of claim 13, further comprising means for changing a relative position between a source of said input wavefront and said polarizing point-diffraction plate.

22. The interferometric measurement device of claim 13, wherein said first polarizing element includes a grating.

23. The interferometric measurement device of claim 13, wherein said first and second polarizing elements include a grating.

24. The interferometric measurement device of claim 13, wherein the polarizing point-diffraction plate is a cover glass for the interferometric measurement device.

25. An interferometric measurement device for characterizing an input wavefront comprising:
a polarizing point-diffraction plate positioned along an optical axis of the device, wherein the plate includes two regions and one of the regions includes a first polarizing element adapted to split the input wavefront into a reference wavefront and a test wavefront with mutually orthogonal polarizations;
a spatial phase-shifting interferometer that includes a splitting section to produce a plurality of copies of the reference and test wavefronts, a phase-shifting section to impart different relative phase shifts between said copies of the reference and test wavefronts, an interference section to combine phase-shifted copies of the reference and test wavefronts to produce corresponding interferograms, and a detector section to spatially sample the interferograms;
wherein the splitting section and the phase-shifting section of the interferometer consists of a polarization beamsplitter, and the interference section consists of a polarizer.

26. The interferometric measurement device of claim 25, wherein the polarization beamsplitter is a birefringent crystal.

27. An interferometric measurement device for characterizing an input wavefront comprising a polarizing point-diffraction plate positioned along an optical axis of the device, wherein the plate includes two regions for splitting the input wavefront into a first polarized wavefront and a second polarized wavefront with mutually orthogonal polarizations, wherein one of the regions includes a means for rotating said first polarized wavefront to produce said second polarized wavefront;
wherein said means for rotating the first polarized wavefront includes a rotation polarization layer and an output thin-film polarization layer.

28. The interferometric measurement device of claim 27, further including an input polarizing layer over said two regions to convert the input wavefront into said first polarized wavefront.

29. The interferometric measurement device of claim 27, further including a metallic layer adjacent to said rotation polarization layer.

30. An interferometric measurement method for characterizing an input wavefront comprising the following steps:
passing the input wavefront through a polarizing point-diffraction plate that includes two regions, one of the regions including a first polarizing element adapted to split the input wavefront into a reference wavefront and a test wavefront having a common optical path and mutually orthogonal polarizations;
passing the reference and test wavefronts through a phase-shifting interferometer maintaining said common optical path;
imaging an interferogram produced by the interferometer onto a detector; and
analyzing the interferogram to characterize the input wavefront;
wherein the other of said two regions includes a second polarizing element perpendicular to the first polarizing element.

31. The interferometric measurement method of claim 30, further comprising the step of coating the plate to modify an optical property of the plate.

32. The interferometric measurement method of claim 30, further comprising the step of changing a relative position between a source of said input wavefront and the plate to modify a power ratio of the test and reference beams.

33. The interferometric measurement method of claim 30, wherein said phase-shifting interferometer includes a splitting section to produce a plurality of copies of the reference and test wavefronts, a phase-shifting section to impart different relative phase shifts between said copies of the reference and test wavefronts, and an interference section to combine phase-shifted copies of the reference and test wavefronts to produce corresponding interferograms.

34. The interferometric measurement method of claim 30, wherein said phase-shifting interferometer is a temporal phase-shifting interferometer.

35. The interferometric measurement method of claim 30, wherein said phase-shifting interferometer is a spatial phase-shifting interferometer.

36. The interferometric measurement method of claim 35, wherein the splitting section includes an optical splitter and the phase-shifting and interference sections consists of a phase interference plate.

37. An interferometric measurement method for characterizing an input wavefront comprising the following steps:

passing the input wavefront through a polarizing point-diffraction plate that includes two regions, one of the regions including a first polarizing element adapted to split the input wavefront into a reference wavefront and a test wavefront having a common optical path and mutually orthogonal polarizations;

passing the reference and test wavefronts through a phase-shifting interferometer maintaining said common optical path;

imaging an interferogram produced by the interferometer onto a detector; and analyzing the interferogram to characterize the input wavefront;

wherein said one region is circumscribed by the other of said two regions of the plate.

38. The interferometric measurement method of claim 37, further comprising the step of coating the plate to modify an optical property of the plate.

39. The interferometric measurement method of claim 37, further comprising the step of changing a relative position between a source of said input wavefront and the plate to modify a power ratio of the test and reference beams.

40. The interferometric measurement method of claim 37, wherein said phase-shifting interferometer includes a splitting section to produce a plurality of copies of the reference and test wavefronts, a phase-shifting section to impart different relative phase shifts between said copies of the reference and test wavefronts, and an interference section to combine phase-shifted copies of the reference and test wavefronts to produce corresponding interferograms.

41. The interferometric measurement method of claim 37, wherein said phase-shifting interferometer is a temporal phase-shifting interferometer.

42. The interferometric measurement method of claim 37, wherein said phase-shifting interferometer is a spatial phase-shifting interferometer.

43. The interferometric measurement method of claim 42, wherein the splitting section includes an optical splitter and the phase-shifting and interference sections consists of a phase interference plate.

44. An interferometric measurement method for characterizing an input wavefront comprising the following steps:

passing the input wavefront through a polarizing point-diffraction plate that includes two regions, one of the regions including a first polarizing element adapted to split the input wavefront into a reference wavefront and a test wavefront having a common optical path and mutually orthogonal polarizations;

passing the reference and test wavefronts through a phase-shifting interferometer maintaining said common optical path;

imaging an interferogram produced by the interferometer onto a detector; and analyzing the interferogram to characterize the input wavefront;

wherein said phase-shifting interferometer is a spatial phase-shifting interferometer that includes a splitting section to produce a plurality of copies of the reference and test wavefronts, a phase-shifting section to impart different relative phase shifts between said copies of the reference and test wavefronts, and an interference section to combine phase-shifted copies of the reference and test wavefronts to produce corresponding interferograms; and the splitting section and the phase-shifting section consists of a polarization beamsplitter, and the interference section consists of a polarizer.

45. The interferometric measurement method of claim 44, wherein the polarization beamsplitter is a birefringent crystal.

46. An interferometric measurement method for characterizing an input wavefront comprising the following steps:

passing the input wavefront through a polarizing point-diffraction plate that includes two regions, one of the regions including a first polarizing element adapted to split the input wavefront into a reference wavefront and a test wavefront having a common optical path and mutually orthogonal polarizations;

passing the reference and test wavefronts through a phase-shifting interferometer maintaining said common optical path;

imaging an interferogram produced by the interferometer onto a detector;

analyzing the interferogram to characterize the input wavefront; and providing a field step conjugate with an input pupil image plane and with a plane of the detector.

47. The interferometric measurement method of claim 46, further comprising the step of changing a relative position between a source of said input wavefront and said polarizing point-diffraction plate.

* * * * *

UNITED STATES PATENT AND TRADEMARK OFFICE
CERTIFICATE OF CORRECTION

| | | |
|---|---|---|
| PATENT NO. | : 7,057,737 B2 | Page 1 of 1 |
| APPLICATION NO. | : 10/652903 | |
| DATED | : June 6, 2006 | |
| INVENTOR(S) | : James E. Miller et al. | |

It is certified that error appears in the above-identified patent and that said Letters Patent is hereby corrected as shown below:

Column 16, line 39; the word "step" should be changed to --stop--.

Signed and Sealed this

Twelfth Day of December, 2006

JON W. DUDAS
*Director of the United States Patent and Trademark Office*